US008337993B2

(12) United States Patent
Surace et al.

(10) Patent No.: US 8,337,993 B2
(45) Date of Patent: Dec. 25, 2012

(54) LOW EMBODIED ENERGY WALLBOARDS AND METHODS OF MAKING SAME

(75) Inventors: Kevin Surace, Sunnyvale, CA (US); Meredith Ware, East Palo Alto, CA (US); Denise Hoover, Oakland, CA (US); Jiaping Han, Sunnyvale, CA (US); Tiandan Chen, Milpitas, CA (US)

(73) Assignee: Serious Energy, Inc., Sunnyvale, CA (US)

( * ) Notice: Subject to any disclaimer, the term of this patent is extended or adjusted under 35 U.S.C. 154(b) by 0 days.

(21) Appl. No.: 12/060,196

(22) Filed: Mar. 31, 2008

(65) Prior Publication Data
US 2009/0130452 A1 May 21, 2009

Related U.S. Application Data (60) Provisional application No. 60/988,744, filed on Nov. 16, 2007.

(51) Int. Cl.
B32B 23/04 (2006.01)

(52) U.S. Cl. ............... 428/532; 428/536; 428/537.5; 428/537.7; 156/39

(58) Field of Classification Search ............... 428/532, 428/536, 537.5, 537.7; 156/39
See application file for complete search history.

(56) References Cited

U.S. PATENT DOCUMENTS

| | | | |
|---|---|---|---|
| 2,811,906 A | 11/1957 | Chappell | |
| 3,160,549 A | 12/1964 | Caldwell et al. | |
| 3,179,529 A | 4/1965 | Hickey et al. | |
| 3,215,225 A | 11/1965 | Kitschner | |
| 3,336,710 A | 8/1967 | Raynes | |
| 3,399,104 A | 8/1968 | Ball, III et al. | |
| 3,424,270 A | 1/1969 | Hartman et al. | |
| 3,462,899 A | 8/1969 | Sherman | |
| 3,579,941 A | 5/1971 | Tibbals | |
| 3,642,511 A | 2/1972 | Cohn et al. | |
| 3,700,470 A | 10/1972 | Barton et al. | |
| 3,828,504 A | 8/1974 | Egerborg et al. | |
| 4,003,752 A | 1/1977 | Isohata et al. | |
| 4,112,176 A | 9/1978 | Bailey | |
| 4,156,615 A | 5/1979 | Cukier | |
| 4,347,912 A | 9/1982 | Flocke et al. | |
| 4,375,516 A | 3/1983 | Barrall | |
| 4,402,751 A | 9/1983 | Wilde | |
| 4,487,793 A | 12/1984 | Haines et al. | |
| 4,618,370 A | 10/1986 | Green et al. | |
| 4,618,380 A | 10/1986 | Alcorn et al. | |
| 4,642,951 A | 2/1987 | Mortimer | |
| 4,659,385 A | 4/1987 | Costopoulos et al. | |
| 4,663,224 A | 5/1987 | Tabata et al. | |
| 4,678,515 A | 7/1987 | Green et al. | |
| 4,685,259 A | 8/1987 | Eberhart et al. | |
| 4,708,910 A * | 11/1987 | Forss | 428/453 |
| 4,759,164 A | 7/1988 | Abendroth et al. | |
| 4,778,028 A | 10/1988 | Staley | |
| 4,786,543 A | 11/1988 | Ferm | |
| 4,924,969 A | 5/1990 | K'Heureux | |
| 4,956,321 A | 9/1990 | Barrall | |
| 4,967,530 A | 11/1990 | Clunn | |
| 4,997,484 A | 3/1991 | Gravitt et al. | |
| 5,016,413 A | 5/1991 | Counihan | |
| 5,026,593 A | 6/1991 | O'Brien | |
| 5,033,247 A | 7/1991 | Clunn | |
| 5,063,098 A | 11/1991 | Niwa et al. | |
| 5,084,102 A | 1/1992 | Brouns et al. | |
| 5,110,660 A | 5/1992 | Wolf et al. | |
| 5,125,475 A | 6/1992 | Ducharme et al. | |
| 5,158,612 A | 10/1992 | Savoly et al. | |
| 5,240,639 A | 8/1993 | Diez et al. | |
| 5,256,222 A | 10/1993 | Shepherd et al. | |
| 5,256,223 A | 10/1993 | Alberts et al. | |
| 5,258,585 A | 11/1993 | Juriga | |
| 5,334,806 A | 8/1994 | Avery | |
| 5,342,465 A | 8/1994 | Bronowicki et al. | |
| 5,368,914 A | 11/1994 | Barrett | |
| 5,435,843 A | 7/1995 | Roy et al. | |

(Continued)

FOREIGN PATENT DOCUMENTS
CA 2219785 10/1996
(Continued)

OTHER PUBLICATIONS

"Damping of plate flexural vibrations by means of viscoelastic laminae" by D. Ross, E.E. Ungar, and E.M. Kerwin—Sturctural Damping, Section III, ASME, 1959, New York (41 pages). Nov. 9, 2006.

(Continued)

Primary Examiner — Leszek Kiliman
(74) Attorney, Agent, or Firm — Wilson Sonsini Goodrich & Rosati (57) ABSTRACT

Wallboards, as well as other building materials, are produced by methods which use significantly reduced embodied energy, generating far less greenhouse gases when compared with the energy used to fabricate gypsum wallboard. A novel cementitious core, consisting in one embodiment of post-industrial waste such as slag and combined with pH modifiers, provides a controlled exothermic reaction to create a gypsum-wallboard-like core which can be wrapped in a selected material such as recycled paper and manufactured on a conveyor system to appear, weigh and handle similar to gypsum wallboard, but without the large amounts of energy required to make gypsum wallboard. The manufacturing process results in lower greenhouse gas emissions than the processes used to make gypsum wallboard.

15 Claims, 6 Drawing Sheets

U.S. PATENT DOCUMENTS

| | | | |
|---|---|---|---|
| 5,439,735 | A | 8/1995 | Jamison |
| 5,473,122 | A | 12/1995 | Kodiyalam et al. |
| 5,474,840 | A | 12/1995 | Landin |
| 5,502,931 | A | 4/1996 | Munir |
| 5,603,192 | A | 2/1997 | Dickson |
| 5,629,503 | A | 5/1997 | Thomasen |
| 5,643,666 | A | 7/1997 | Eckart et al. |
| 5,664,397 | A | 9/1997 | Holz |
| 5,679,452 | A | 10/1997 | Minagawa et al. |
| 5,691,037 | A | 11/1997 | McCutcheon et al. |
| 5,695,867 | A | 12/1997 | Saitoh et al. |
| 5,714,003 | A | 2/1998 | Styron |
| 5,768,841 | A | 6/1998 | Swartz et al. |
| 5,800,647 | A | 9/1998 | Andersen et al. |
| 5,824,973 | A | 10/1998 | Haines et al. |
| 5,830,815 | A | 11/1998 | Wagh et al. |
| 5,846,894 | A | 12/1998 | Singh et al. |
| 5,867,957 | A | 2/1999 | Holtrop |
| 5,910,082 | A | 6/1999 | Bender et al. |
| 5,945,208 | A | 8/1999 | Richards et al. |
| 5,954,497 | A | 9/1999 | Cloud et al. |
| 6,077,613 | A | 6/2000 | Gaffigan |
| 6,123,171 | A | 9/2000 | McNett et al. |
| 6,136,088 | A | 10/2000 | Farrington |
| 6,213,252 | B1 | 4/2001 | Ducharme |
| 6,240,704 | B1 | 6/2001 | Porter |
| 6,266,427 | B1 | 7/2001 | Mathur |
| 6,286,280 | B1 | 9/2001 | Fahmy et al. |
| 6,290,021 | B1 | 9/2001 | Strandgaard |
| 6,309,985 | B1 | 10/2001 | Virnelson et al. |
| 6,342,284 | B1 | 1/2002 | Yu et al. |
| 6,381,196 | B1 | 4/2002 | Hein et al. |
| 6,389,771 | B1 | 5/2002 | Moller |
| 6,391,398 | B1 * | 5/2002 | Pesu et al. ............... 428/13 |
| 6,391,958 | B1 | 5/2002 | Luongo |
| 6,443,256 | B1 | 9/2002 | Baig |
| 6,458,423 | B1 | 10/2002 | Goodson |
| 6,471,767 | B1 | 10/2002 | Konczak |
| 6,632,550 | B1 | 10/2003 | Yu et al. |
| 6,676,744 | B2 | 1/2004 | Merkley et al. |
| 6,699,426 | B1 | 3/2004 | Burke |
| 6,715,241 | B2 | 4/2004 | Gelin et al. |
| 6,716,293 | B2 * | 4/2004 | Taymourian et al. ........... 156/39 |
| 6,758,305 | B2 | 7/2004 | Gelin et al. |
| 6,790,520 | B1 | 9/2004 | Todd et al. |
| 6,800,161 | B2 | 10/2004 | Takigawa |
| 6,803,110 | B2 | 10/2004 | Drees et al. |
| 6,815,049 | B2 | 11/2004 | Veeramasuneni |
| 6,822,033 | B2 | 11/2004 | Yu et al. |
| 6,825,137 | B2 | 11/2004 | Fu et al. |
| 6,877,585 | B2 | 4/2005 | Tinianov |
| 6,913,667 | B2 | 7/2005 | Nudo et al. |
| 6,920,723 | B2 | 7/2005 | Downey |
| 6,941,720 | B2 | 9/2005 | DeFord et al. |
| 7,041,377 | B2 | 5/2006 | Miura et al. |
| 7,068,033 | B2 | 6/2006 | Sellers et al. |
| 7,181,891 | B2 | 2/2007 | Surace et al. |
| 7,197,855 | B2 | 4/2007 | Della Pepa |
| 7,255,907 | B2 | 8/2007 | Feigin et al. |
| 7,407,545 | B2 | 8/2008 | Wallner |
| 7,491,267 | B2 | 2/2009 | Francis et al. |
| 7,740,700 | B2 | 6/2010 | Wallner |
| 7,867,597 | B2 | 1/2011 | Feigin et al. |
| 2004/0016184 | A1 | 1/2004 | Huebsch et al. |
| 2004/0025752 | A1 | 2/2004 | Sugama |
| 2004/0168853 | A1 | 9/2004 | Gunasekera et al. |
| 2004/0214008 | A1 | 10/2004 | Dobrusky et al. |
| 2005/0103568 | A1 | 5/2005 | Sapoval et al. |
| 2005/0229809 | A1 | 10/2005 | Lally |
| 2005/0252419 | A1 | 11/2005 | Mabey |
| 2006/0048682 | A1 | 3/2006 | Wagh et al. |
| 2006/0057345 | A1 | 3/2006 | Surace et al. |
| 2006/0059806 | A1 | 3/2006 | Gosling et al. |
| 2006/0108175 | A1 | 5/2006 | Surace et al. |
| 2007/0008723 | A1 * | 1/2007 | Hampton ............... 362/240 |
| 2007/0009723 | A1 | 1/2007 | Ogawa et al. |
| 2007/0094950 | A1 | 5/2007 | Surace et al. |
| 2007/0107350 | A1 | 5/2007 | Surace et al. |
| 2008/0171179 | A1 | 7/2008 | Surace et al. |
| 2008/0286609 | A1 | 11/2008 | Surace et al. |
| 2009/0130452 | A1 | 5/2009 | Surace et al. |
| 2010/0077698 | A1 | 4/2010 | Tinianov |
| 2010/0101457 | A1 | 4/2010 | Surace et al. |

FOREIGN PATENT DOCUMENTS

| | | |
|---|---|---|
| CN | 1118771 A | 3/1995 |
| CN | 1583653 A | 2/2005 |
| CN | 1803697 A | 7/2006 |
| EP | 1 154 087 B1 | 11/2001 |
| JP | 09-203153 | 8/1997 |
| KR | 10-1996-0006226 B1 | 5/1996 |
| WO | WO 96/34261 | 10/1996 |
| WO | WO 97/19033 | 5/1997 |
| WO | WO 00/24690 | 5/2000 |
| WO | WO 02/090292 A2 | 11/2002 |
| WO | WO 02/090292 A3 | 11/2002 |

OTHER PUBLICATIONS

"Green Glue is your soundproofing solution and noise reduction material", www.greengluecompany.com (2 pages).

A Guide to Airborne, Impact, and Structureborne Noise Control in Multifamily Dwellings, U.S. Department of Housing and Urban Development, Prepared for the National Bureau of Standards, Washington, D.C., Jan. 1963 (5 pages).

A Study of Techniques to Increase the Sound of Insulation of Building Elements, Wyle Laboratories, Prepared for Dept. of Housing and Urban Development, Jun. 1973 (12 pages).

Acoustical: A Sound Approach to Testing, www.archest.com/pages (2 pages). Accessed Aug. 13, 2003.

Architectural Acoustics, M. David Egan, J. Ross Publishing (Reprint 2007) p. 211; originally published McGraw-Hill, 1988 (5 pages).

Architectural Acoustics, Principles and Practice, John Wiley & Sons, 1992, Cavanaugh, William J. and Wilkes, Joseph A. (editors) (332 pages).

ASC WallDamp materials from Acoustic Sciences Corporation http://web.archive.org/web/20021013031149/www.asc-soundproof.com/index-walldamp . . . May 18, 2007 (21 pages).

ASTM International, Designation: C1396/C 1396M-04, Standard Specification for Gypsum Board (7 pages). 2004.

International Search Report in corresponding International Applicaiton No. PCT/US08/63747 dated Aug. 6, 2008 (2 pages).

Notification of Transmittal of the International Search Report in corresponding International Application No. PCT/US08/63747 dated Aug. 6, 2008(1 page).

Written Opinion of the International Searching Authority in corresponding International Application No. PCT/US08/63747 dated Aug. 6, 2008 (9 pages).

dB Rock materials OMNI Products, Inc. (3 pages).

dB-Ply materials Sound Reducing Panels from Greenwood Forest Products, Inc., Apr. 24, 1997 (9 pages).

Dynamant materials http://web.archive.org/web/20010525113753/www.admteschusa.com/Dynamat,html Jun. 12, 2007, ADM Tech—Dynamic Control (15 pages).

FIRE Resistance Design Manual, Sound Control, Gypsum Association, GA-600-94 (14th Ed.) (107 pages). 1994.

FIRE Resistance Design Manual, Sound Control, Gypsum Association, GA 600-97 (15th Ed.) (120 pages). 1997.

FIRE Resistance Design Manual, Sound Control, Gypsum Association, GA 600-2000 (16th Ed.) (139 pages). 2000.

Frankovich, David, The Four-Fold Method of Noise and Vibration Control (8 pages).

Handbook of Acoustical Measurements and Noise Control, Edited by Cyril Harris, Chapter 32; Structureborne Sound Isolation, CHapter 33: Noise Control in Buildings, McGraw-Hill, Inc., 1991, (36 pages).

Harris, C.M., Editor. Dictionary of Architecture & Construction 2200 Illustrations, Third Edition. McGraw-Hill. 2000: pp. 447-448, 478-479, 534.

Hastings, Mardi C.; Godfrey, Richard, G. Madison, Application of Small Panel Daping Measurements to Larger Walls, Proc. SPIE vol. 2720, p. 70-76, Smart Structures and Materials 1996; Passive Damping and Isolation (7 pages).

IES 2000 Dampening and Viscoelastic Membranes (Jul. 2, 2003) Atlanta.com/product (pages 1-6).

Jones, Robert E. Field Sound Insulation Evaluation of Load-Bearing Sandwich Panels for Housing. Forest Products Laboratory, Forest Service, U.S. Department of Agriculture. Aug. 1975 (53 pages).

Joyal, Brian, Constrained-Layer Systems Provide Weight-Efficient, High Level Damping (4 pages). 2000.

Keller, H., Erb, U. Dictionary of Engineering Materials. Wiley-Interscience. John Wiley & Sons, Inc. 2004: pp. 504, 1241.

Lippiatt, Barbara C., National Institute of Standards and Technology, BEES 3.0, "Building for Environmental and Economic Sustainability Technical Manual and User Guide", Oct. 2002, (198 pages).

Nashif, Ahid D.; Jones, David I. G.; Henderson, John P., Vibration Damping, pp. 290-305, John Wiley & Sons, 1985 (18 pages).

Noise and Vibration Control Engineering, Principles and Application, pp. 466-479, John Wiley & Sons, 1992, Beranek, Leo L. and Ver, Istvan L. (editors) (9 pages).

Noise and Vibration Control Engineering: Principles and Applications, Edited by Leo Beranek and Instvan Ver, Chapter II, John Wiley & Sons, Inc., 1992, (12 pages).

Noise and Vibration Control, Revised Edition, pp. 306-315, Institute of Noise Control Engineering, 1988, Beranek, Leo L. (editor) (9 pages).

Noise and Vibration, Chapter Fourteen, Damping of Panels, Ungar, Eric E., pp. 434-473, McGraw-Hill, 1971, Beranek, Leo L. (editor) (7 pages).

Noise Killer: Pro Damping Compound Materials http://www.tnt-audio.com/clinica/noise.html May 18, 2007, 1998 (3 pages).

Nordisk Akustik A/S materials, http://web.archive.org/web/200206240933724/www.nordisk-akustik.dk/html_uk/prod03.ht . . . Jun. 11, 2007 (4 pates).

Northwood, T.D. Transmission Loss of Plasterboard Walls. Building Research Note, Division of Building Research, National Research Counsel, Ottawa, Canada. 1968 (10 pages).

Noxon, Arthur M., The Chain is as Strong as Its Weakest Link, An article written for the first Hong Kong HiFi Show, 1993, Translated and Published in Chinese, http://www.acousticsciences.com/articles/chain.htm (7 pages).

Ostergaard, P.B., Cardinell, R.L., and Goodfriend, L.S. Transmission Loss of Leaded Building Materials. The Journal of the Acoustical Society of America, vol. 35, No. 6. Jun. 1963:834-843.

Quiet Lightweight Floor Systems, Reprint from Sound and Vibration Magazine, Jul. 1992, by David A. Harris, Building & Acoustic Design Consultants (7 pages).

Renninger, Jennifer, Understanding Damping Techniques for Noise and Vibration Control (8 pages). 2000.

Sound Studio Construction on a Budget, F. Alton Everest, McGraw-Hill, 1997 (7 pages).

Sounddown Viscoelastic Glue DG-A2, Sounddown Corporation (2 pages).

STC-Sound Transmission Class-Discussion and Use, www.sota.ca/stc_info.htm (3 pages).

Takada, et al., Effect in Reducing Floor Impact Noise of Recyucled Paper Damper Members, Bulletin of Tokyo Metropolitan Industrial Technology Research Institute, No. 2 (1999) [certified English translation] (13 pages).

Unified Facilities Criteria (UFC) Noise and Vibration Control, UFC 3-450-01. May 15, 2003, Department aof Defense (156 pages).

United States Gypsum, Architectural and Construction Services, Design Data for Acousticians, Feb. 1986 (4 pages).

van Vuure, A.W.; Verpoest, I.; Ko, F.K., Sandwich-Fabric Panels as Spacers in a Constrained Layer Structural Damping Application, Composites Part B 32 (2001) 11-19, Elsevier Science Ltd. (9 pages).

Vandersall, H.L. "Intumescent Coating Systems, Their Development and Chemistry". J. Fire & Flammability, vol. 2. Apr. 1971:97-140.

Walker, M.B., General Editor. Chambers Science and Technology Dictionary. W&R Chambers Ltd and Cambridge University Press; 1999:954.

Waybackmachine search results for Jan. 1, 1996-Jun. 12, 2007 (1 page).

Waybackmachine search results for Jan. 1, 1996-May 3, 2006 (1 page).

Wood Handbook/Wood as an Engineering Material, United States Department of Agriculture, Forest Service, General Technical report FPL-GTR 113, Mar. 1999 (24 pages).

Surace, Kevin J.; U.S. Appl. No. 11/754,220, filed May 25, 2007, entitled Low Embodied Energy Sheathing Panels and Methods of Making Same.

Tinianov, Brandon D.; U.S. Appl. No. 11/772,173, filed Jun. 30, 2007, entitled Low Embodied Energy Sheathing Panels with Optimal Water Vapor Permeance and Methods of Making Same.

International search report dated May 27, 2009 for PCT Application No. US2008/83463.

Walker, M.B., General Editor. Chambers Science and Technology Dictionary. W&R Chambers Ltd and Cambridge University Press; 1988:954.

* cited by examiner

Figure 2

EcoRock manufacturing process

Figure 3 con't

Continuation of Figure 3

|  | FAC Loading | | | | |
|---|---|---|---|---|---|
|  | % | % | % | % | % |
| FAC | 10.00 | 20.00 | 30.00 | 40.00 | 50.00 |
| BFS | 53.23 | 47.32 | 41.40 | 35.49 | 29.57 |
| LKD | 21.09 | 18.75 | 16.40 | 14.06 | 11.72 |
| pH Modifier | 15.68 | 13.94 | 12.20 | 10.45 | 8.71 |

Figure 4 con't.

Continuation of Figure 4

| Slag Loading | 1 | 2 | 3 | 4 | 5 |
|---|---|---|---|---|---|
| | % | % | % | % | % |
| BFS | 10.00 | 20.00 | 30.00 | 40.00 | 50.48 |
| LKD | 36.35 | 32.31 | 28.27 | 24.23 | 20.00 |
| pH Modifier | 27.03 | 24.02 | 21.02 | 18.02 | 14.87 |
| FAC | 26.63 | 23.67 | 20.71 | 17.75 | 14.65 |

LOW EMBODIED ENERGY WALLBOARDS AND METHODS OF MAKING SAME

This application claims the benefit of priority to U.S. Provisional Patent Application Ser. No. 60/988,744 filed on Nov. 16, 2007, which is incorporated herein by reference in its entirety.

FIELD OF INVENTION

The present invention relates to new compositions of wallboard cores and the processes for fabricating such cores. More particularly, the invention provides cores and processes which reduce the energy required to manufacture wallboards when compared to the energy required to manufacture traditional gypsum wallboards.

BACKGROUND OF INVENTION

Gypsum wallboard is used in the construction of residential and commercial buildings to form interior walls and ceilings and also exterior walls in certain situations. Because it is relatively easy to install and requires minimal finishing, gypsum wallboard is the preferred material to be used for this purpose in constructing homes and offices.

Gypsum wallboard consists of a hardened gypsum-containing core surfaced with paper or other fibrous material suitable for receiving a coating such as paint. It is common to manufacture gypsum wallboard by placing an aqueous core slurry comprised predominantly of calcined gypsum between two sheets of paper thereby forming a sandwich structure. Various types of cover paper or similar functioning member are known in the art. The aqueous gypsum core slurry is required to set or harden by rehydration of the calcined gypsum, usually followed by heat treatment in a dryer to remove excess water. After the gypsum slurry has set (i.e., reacted with water present in the aqueous slurry) and dried, the formed sheet is cut into required sizes. Methods for the production of gypsum wallboard are well known in the art.

A conventional process for manufacturing the core composition of gypsum wallboard initially includes premixing dry ingredients in a high-speed, continuous mixing apparatus. The dry ingredients often include calcium sulfate hemihydrate (stucco), an accelerator, and an antidesiccant (e.g., starch). The dry ingredients are mixed together with a "wet" (aqueous) portion of the core composition in a mixer apparatus. The wet portion can include a first component that includes a mixture of water, paper pulp, and, optionally, one or more fluidity-increasing agents, and a set retarder. The paper pulp solution provides a major portion of the water that forms the gypsum slurry of the core composition. A second wet component can include a mixture of the aforementioned strengthening agent, foam, and other conventional additives, if desired. Together, the aforementioned dry and wet portions comprise the aqueous gypsum slurry that eventually forms a gypsum wallboard core.

The major ingredient of the gypsum wallboard core is calcium sulfate hemihydrate, commonly referred to as "calcined gypsum," "stucco," or "plaster of Paris." Stucco has a number of desirable physical properties including, but not limited to, fire resistance, thermal and hydrometric dimensional stability, compressive strength, and neutral pH. Typically, stucco is prepared by drying, grinding, and calcining natural gypsum rock (i.e., calcium sulfate dihydrate). The drying step in the manufacture of stucco includes passing crude gypsum rock through a rotary kiln to remove any moisture present in the rock from rain or snow, for example. The dried rock then is ground to a desired fineness. The dried, fine-ground gypsum can be referred to as "land plaster" regardless of its intended use. The land plaster is used as feed for calcination processes for conversion to stucco.

The calcination (or dehydration) step in the manufacture of stucco is performed by heating the land plaster which yields calcium sulfate hemihydrate (stucco) and water vapor. This calcination process step is performed in a "calciner," of which there are several types known by those of skill in the art. The calcining process itself is energy intensive. Several methods have been described for calcining gypsum using single and multi staged apparatus, as described in U.S. Pat. No. 5,954,497, which is incorporated by reference herein.

Calcined gypsum reacts directly with water and can "set" when mixed with water in the proper ratios.

During the conventional manufacture of gypsum board, gypsum slurry is deposited upon a moving paper (or fiberglass matt) substrate. The gypsum slurry may consist of several additives to reduce weight and add other properties. The moving paper or substrate itself is supported on a long moving belt. A second paper substrate is then applied on top of the slurry to constitute the second face of the gypsum board and the sandwich is passed through a forming station, which determines the width and thickness of the gypsum board. In such a continuous operation the gypsum slurry begins to set after passing through the forming station. When sufficient setting has occurred the board is cut into commercially acceptable lengths and then passed into a board dryer. Thereafter the board is trimmed if desired, taped, bundled, shipped, and stored prior to sale.

The majority of gypsum wallboard is sold in sheets that are four feet wide and eight feet long. The thicknesses of the sheets vary from one-quarter inch to one inch depending upon the particular grade and application, with a thickness of ½ inch or ⅝ inch being common. A variety of sheet sizes and thicknesses of gypsum wallboard are produced for various applications. Such boards are easy to use and can be conveniently scored and snapped to break them in relatively clean lines.

The process to manufacture gypsum wallboard is by some accounts over 100 years old. It was developed at a time when energy was plentiful and cheap, and greenhouse gas issues were unknown. This is an important consideration. While gypsum wallboard technology has improved over the years to include fire resistance as an attribute of certain wallboards, and gypsum wallboard testing has been standardized (such as in the American Society of Testing and Materials standardized test method C1396), there has been little change in the major manufacturing steps, and the majority of wallboard is still made from calcined gypsum.

Figure 1:
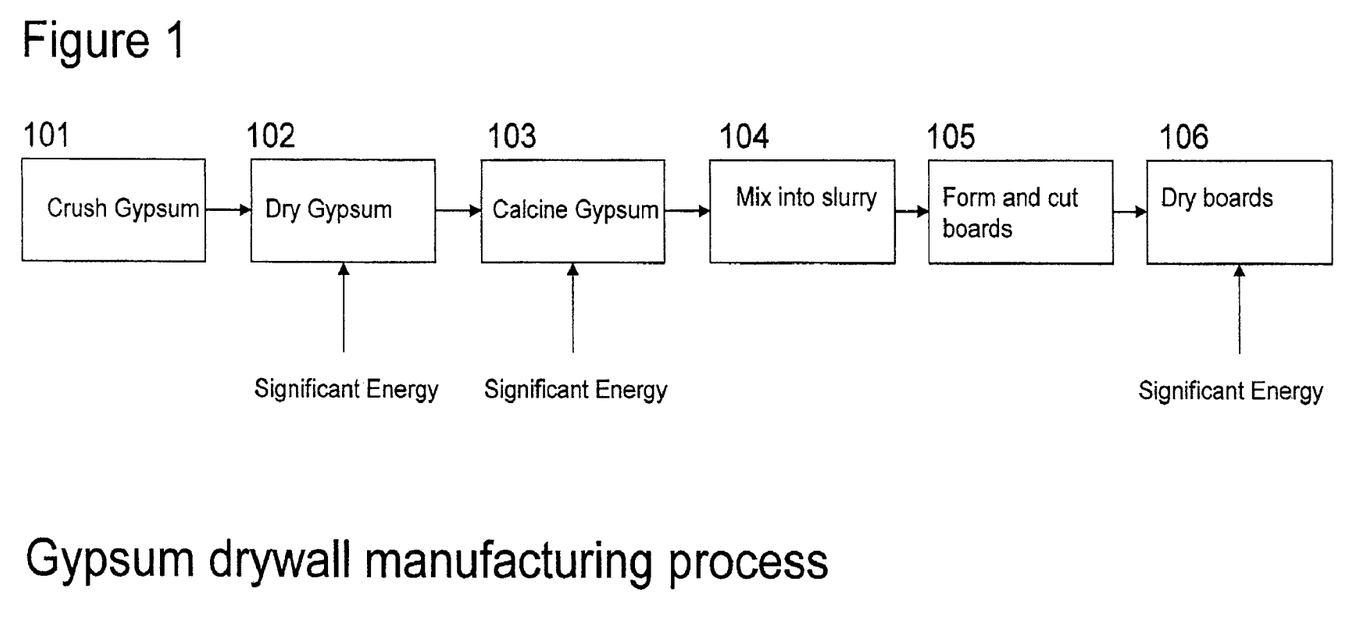
FIG. 1 shows certain standard gypsum drywall manufacturing steps, specifically those which consume substantial amounts of energy.

As shown in FIG. 1, which depicts the major steps in a typical process to manufacture gypsum wallboard, gypsum wallboard requires significant energy to produce. The term "embodied energy" used herein may be defined as the total energy required to produce a product from the raw materials stage through delivery of finished product. As shown in FIG. 1, three of the illustrated steps (Step 102: drying gypsum, Step 103: calcining gypsum, Step 106: drying the boards) in the manufacture of gypsum wallboard require considerable energy. Thus the embodied energy of gypsum, and the resultant greenhouse gasses emitted from its manufacture, are very high. However few other building materials exist today to replace gypsum wallboard.

Energy is used throughout the gypsum process. After the gypsum rock is pulled from the ground it must be dried, typically in a rotary or flash dryer. Then it must be crushed and then calcined (though crushing often comes before drying).

All of these processes require significant energy just to prepare the gypsum for use in the manufacturing process. After it has been calcined, it is then mixed typically with water to form a slurry which begins to set, after which the boards (cut from the set slurry) are dried in large board driers for about 40 to 60 minutes to evaporate the residual water, using significant energy. Often up to one pound (1 lb) per square foot of water needs to be dried back out of the gypsum board prior to packing. Thus, it would be highly desirable to reduce the total embodied energy of gypsum wallboard, thus reducing energy costs and greenhouse gasses.

Greenhouse gasses, particularly $CO_2$, are produced from the burning of fossil fuels and also as a result of calcining certain materials. Thus the gypsum manufacturing process generates significant amounts of greenhouse gasses due to the requirements of the process.

According to the National Institute of Standards and Technology (NIST—US Department of Commerce), specifically NISTIR 6916, the manufacture of gypsum wallboard requires 8,196 BTU's per pound. With an average ⅝ inch thick gypsum board weighing approximately 75 pounds, this equates to over 600,000 BTU's per board total embodied energy. Other sources suggest that embodied energy is much less than 600,000 BTU's per board, and in a very recently built plant may be closer to 100,000 BTU per ⅝ inch thick board. Still, this is quite significant. It has been estimated that embodied energy constitutes over 30% of the cost of manufacture. As energy costs increase, and if carbon taxes are enacted, the cost of manufacturing wallboard from calcined gypsum will continue to go up directly with the cost of energy. Moreover, material producers carry the responsibility to find less-energy dependent alternatives for widely used products as part of a global initiative to combat climate change.

The use of energy in the manufacture of gypsum wallboard has been estimated to be 1% or more of all industrial energy usage (in BTU's) in the US. With 30 to 40 billion square feet of wallboard used each year in the US, some 200 trillion BTU's may be consumed in the manufacture of same. And as such, more than 25 billion pounds of greenhouse gasses are released into the atmosphere through the burning of fossil fuels to support the heat intensive processes, thus harming the environment and contributing to global climate change.

As mentioned above, the main ingredient in gypsum wallboard is calcium sulfate hemihydrate (calcium sulfate dehydrate before calcination), which on average is 90-99% of the wallboard core. Calcium sulfate dehydrate or raw gypsum rock is mined directly from the earth's crust, requiring mining, crushing and transportation energy. Additionally, increasing environmental concerns call for responsible manufacturing through use of any post-industrial waste in place of virgin resources such as mined gypsum rock. Recyclable by-products exist in many manufacturing industries such as coal-generated electricity, various metal purification processes, expanded perlite production and cement and lime kilns to name a few. An important aspect of lowering embodied energy is the incorporation of post-industrial waste into the wallboard core, which reduces energy usage associated with land-filling and disposing of these unwanted materials.

Prior efforts in gypsum manufacturing generally focused on reducing the weight of gypsum board, increasing its strength, or making minor reductions in energy use. For example, in U.S. Pat. No. 6,699,426, a method is described which uses additives in gypsum board to reduce the drying time and thus reduce energy usage at the drying stage. These attempts generally explicitly assume the use of calcined gypsum (either natural or synthetic), since gypsum wallboard manufacturers would find that redesigning the materials and mining procedures from scratch would potentially throw away billions of dollars of infrastructure and know-how, and render their gypsum mines worthless.

Therefore, given concerns about climate change, it would be desirable to manufacture wallboard which requires dramatically less energy usage during manufacturing. There is a need also for substantially reducing or eliminating energy intensive calcining and drying steps which are common to gypsum wallboard manufacturing.

SUMMARY OF INVENTION

The invention provides wallboard compositions and their methods of manufacture. Various aspects of the invention described herein may be applied to the particular applications set forth below or for a variety of other kinds of materials. It shall be understood that different aspects of the invention can be appreciated individually, collectively or in combination with each other.

In accordance with one aspect of the present invention, new methods of manufacturing novel wallboards are provided. These structures may be described as low embodied energy wallboards that can provide ecological solutions to the ever growing demand for sustainable building and construction materials. The resulting novel and ecological wallboards provided in accordance with this aspect of the invention can replace gypsum wallboards (referred to as gypsum boards or plaster boards) or water-resistant cement boards in most applications. While the new methods described herein may be in conjunction with the manufacture of wallboards, it shall be understood that these methods can be applied and used to manufacture other building materials such as roof tiles, deck tiles, floor tiles, sheathing, cement boards, masonry blocks, and other similar building materials.

In one embodiment of the invention, a wallboard may comprise at least two post-industrial waste products, said post-industrial waste products comprising at least two waste products selected from the group consisting of steel slag, blast furnace slag, metal purification slag, expanded perlite by-product, lime kiln dust, or cement kiln dust. The wallboard may also include the addition of at least one pH modifier.

In another preferable embodiment, the wallboard comprises at least one post-industrial waste product, said post-industrial waste product comprising at least one waste product selected from the group consisting of steel slag, blast furnace slag, metal purification slag, expanded perlite by-product, lime kiln dust, or cement kiln dust, and also the addition of at least one pH modifier.

Another preferable embodiment of the invention provides substantially gypsum free wallboards or by-product wallboards. Such wallboards may be formed from post-industrial waste compositions or by-products described herein. While certain raw or starting materials for the wallboards may contain relatively low amounts of gypsum, the final mixtures and wallboard end products may contain no detectable amounts of gypsum. Other embodiments may include less than approximately 1% gypsum content which may vary depending on the accuracy and resolution of measurement apparatus based on X-ray diffraction (XRD) and other techniques.

In each of the embodiments of this invention, fly ash can be added to the post-industrial waste products if desired. Typically, the fly ash will be less than fifty percent (50%) by weight of the total constituents in the wallboard.

Wallboards and other building materials provided in accordance with this invention are fabricated with a significant reduction in the embodied energy associated with the wallboards or other building materials, thus substantially reducing greenhouse gas emissions that harm the environment.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

This invention will be fully understood in light of the following detailed description taken together with the drawings.

INCORPORATION BY REFERENCE

All publications, patents, and patent applications mentioned in this specification are herein incorporated by reference to the same extent as if each individual publication, patent, or patent application was specifically and individually indicated to be incorporated by reference.

DETAILED DESCRIPTION OF INVENTION

The following detailed description of embodiments of the invention is illustrative only and not limiting. Other embodiments will be obvious to those skilled in the art in view of this description.

The novel processes as described herein for manufacturing wallboard and/or other building materials eliminate the most energy intensive prior art processes and materials in the manufacture of gypsum wallboard or other building materials such as gypsum mining, drying, calcining, and board or finished product drying. These new processes allow wallboard and other building materials to be formed from post-industrial waste materials and non-calcined materials which are plentiful and safe and which can react naturally to form a strong board that is also fire resistant. Wallboard may be produced to meet both interior and exterior requirements. Other building materials of different shapes may also be produced for use in constructing buildings or infrastructure using these same methods. Preferable embodiments of the invention are generally described below in the context of wallboard. But it should be understood that the processes described can also be modified to fabricate other building materials and thus the following descriptions are not limiting.

A preferable embodiment of the invention provides low embodied energy wallboards containing a core containing greater than 50% post-industrial waste, and a pH modifier. In preferred embodiments, the amount of post-industrial waste will be much higher than 50% noting that the energy savings increase as recycled material content approaches 100%. Post-industrial waste may include or be derived from: type C fly ash (FAC), type F fly ash, uncategorized fly ash, steel slag, blast furnace slag (BFS), other metal purification slag, expanded perlite by-product, flu gas desulphurization, lime kiln dust (LKD), cement kiln dust or any combination thereof. However, as the recycled waste content increases, it is preferred that the type C fly ash content be kept below 50%, because higher concentrations of fly ash may degrade the physical properties required of wallboard applications. A variety of one or more pH modifiers may be selected for various embodiments of the invention herein, including but not limited to the following: oxides, hydroxides, carbonates, silicates or aluminates; calcium oxide, magnesium oxide, potassium hydroxide, sodium hydroxide, calcium hydroxide, calcium carbonate, potassium carbonate, sodium carbonate, sodium sesquicarbonate, sodium silicate, calcium silicate, magnesium silicate or calcium aluminate.

Different Applications and Use of Post-Industrial Waste Like Materials

Several U.S. patents have described the use of some of the aforementioned post-industrial waste in the development of cementitious applications. It shall be understood that any of the waste components disclosed in the following patents, which are incorporated by reference in their entirety, may be utilized with various aspects of the invention herein. For example, U.S. Pat. No. 5,435,843 discusses a cement composed of type C fly ash and an alkali metal activator for mortar and concrete applications. U.S. Pat. No. 4,997,484 requires the same with the addition of citric acid. In both patents there is no mention of wallboard applications or consideration of post-industrial wastes other than type C fly ash. U.S. Pat. No. 5,714,003 expands the scope to use any sub-bitumous fly ash, and requires potassium carbonate, citric acid and retarding agent for general cement applications, but again contains no mention of wallboard applications. U.S. Pat. No. 5,084,102 considers another post-industrial waste, blast furnace slag, as an ingredient for a ready-to-use dry powder that when combined with water can be used in concrete constructions, products or parts. For the most part, concrete applications do not align with wallboard applications due to the impossibility or lack of necessity for wallboard to include large or small aggregate due to weight limitations and practical considerations.

Furthermore, U.S. Pat. No. 3,700,470 describes a similar mixture of a ceramic filler, specifically powder station fly ash, blast furnace slag, pumice, red mud waste or sand fines, along with a powdered metal to make solid shapes, which could expand to wallboard-type applications. However this patent includes the additional requirement of an aqueous sodium silicate and heat to cure. As mentioned above, the wallboards provided in accordance with the invention succeed in having a low embodied energy by not requiring or allowing any curing heat. Moreover, low embodied energy wallboards provided herein preferably exclude sodium silicate due to the fact that a manufacturing process which includes such materials release carbon dioxide (a green house gas) by combining sodium carbonate and silicon dioxide.

While cement boards have been described in the prior art using both Portland cement and using, in part, calcined magnesia (such as in U.S. Pat. No. 4,003,752), these boards have several important differences in comparison to wallboards including weight, processing and score/snap capability. These boards are not manufactured using a naturally occurring exothermic reaction.

U.S. Pat. No. 6,716,293 describes a wallboard comprised of 60%-66% fly ash, without requiring other post-industrial waste products. Such wallboards however could be too heavy compared to standard wallboards available today, and may not meet all of the requirements of standard wallboard. Because the low embodied energy wallboards provided in accordance with the invention contain a much higher total percentage of recycled content (typically about >85% by weight), the amount of fly ash which can be accommodated is much less, typically less than approximately 50%, and often less than approximately 30%. It has been found that keeping fly ash content to less than approximately 30%, and in some embodiments approximately 0%, while combining the post-industrial waste materials used in the manufacture of the wallboard, can achieve an optimum property in new wallboards provided herein. That is, with substantially zero percent (0%) by weight fly ash in a wallboard, the expansion of the wallboard due to changes in the properties of the post-industrial waste in the wallboard as a function of time is no more than approximately one tenth of one percent (0.1%.)

Figure 3:
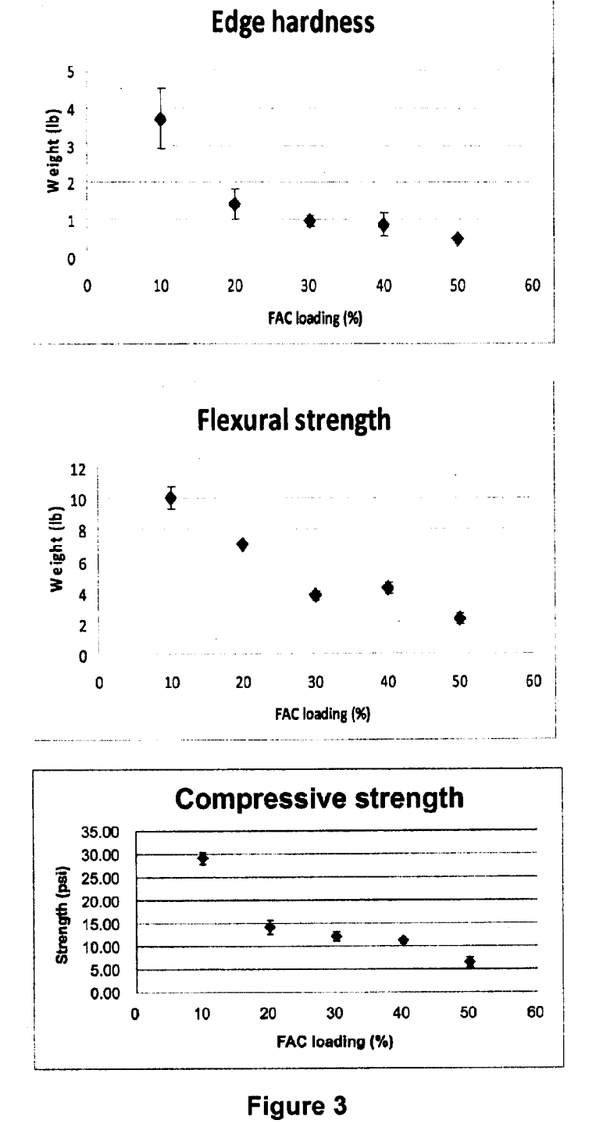
FIG. 3 shows plots of some properties of low embodied energy wallboards provided in accordance with the invention.

Some properties of the low embodied energy wallboards provided in accordance with the invention can be modified with an increased loading of fly ash. This can be shown below in accordance with ASTM testing methods (see FIG. 3). For example, as the fly ash (fly ash Type C, FAC/NRG, Buffalo, N.Y.) content approaches 0%, the edge hardness, core hardness, flexural strength and compressive strength may become optimal or more preferable for certain applications.

Figure 4:
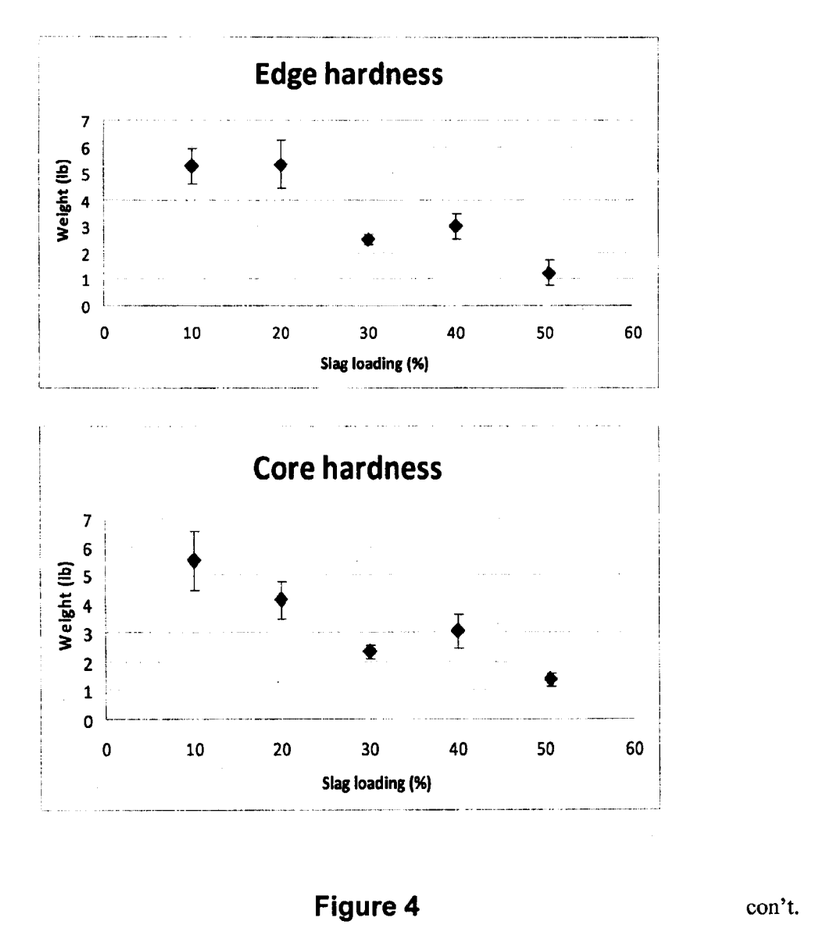
FIG. 4 shows plots of some properties of low embodied energy wallboards provided in accordance with the invention.

Some properties of other low embodied energy wallboards provided in accordance with other embodiments of the invention can be modified with an increased loading of slag (blast furnace slag). For example, as the slag (BFS/Baltimore, Md.) content approaches 0%, the edge hardness, core hardness, flexural strength and compressive strength may become optimal or more preferable for certain applications (see FIG. 4).

Furthermore, U.S. Pat. No. 6,391,398 describes wallboard containing expanded perlite and synthetic binder. The perlite mentioned should not to be confused with perlite by-product, a waste produced during the production of such expanded perlite. Due to the high temperatures perlite rock endures in order to expand to the light-weight perlite product as mentioned in this patent, the disclosed wallboard uses the perlite by-product, a much smaller particle size perlite, which is considered not useful and would otherwise be disposed of in a landfill.

Wallboard Additives

In making low embodied energy wallboard in accordance with the invention, it may be preferable to combine powdered post-industrial waste along with other powdered additives. These additives include agents or compounds for retarding, accelerating or modifying pH. Moreover, reactionary or adhesive components can be also added or mixed together at the start of a particular manufacturing process or processes selected to be used to form the low embodied energy wallboard or wallboards herein. Prior to the addition of liquids, such as water, this mix of powders may be referred to or called the "dry mix."

The resulting low embodied energy wallboard products herein may depend on the naturally occurring remaining composition of industrial processing of mined raw materials to form a self-hardening (exothermic) reaction. When harnessed effectively, hydration will initiate a self-hardening reaction within these "waste" materials. Because low embodied energy wallboards may incorporate by-products that are not manufactured for specific chemical composition or further industrial use, each source can have a unique makeup when compared to other sources of the same material. Thus it is preferable or often times necessary to optimize with the specific chemical composition of each unique source for the best or desired combination of waste materials in wallboard end products.

The typical compositions of considered post-industrial waste materials follow, however these ranges are not representative of all waste material sources that may be considered useful in the low embodied energy wallboards:

| Fly Ash Type C | |
|---|---|
| Component | Percentage |
| $SiO_2$ | 15-60 |
| $Al_2O_3$ | 10-30 |
| $Fe_2O_3$ | 4-15 |
| CaO | 5-40 |
| MgO | 1-10 |
| $SO_3$ | 0-10 |
| $Na_2O$ | 0-6 |
| $K_2O$ | 0-4 |
| LOI | 0-5 |

| Fly Ash Type F | |
|---|---|
| Component | Percentage |
| $SiO_2$ | 20-60 |
| $Al_2O_3$ | 5-35 |
| $Fe_2O_3$ | 10-40 |
| CaO | 1-12 |
| MgO | 0-5 |
| $SO_3$ | 0-4 |
| $Na_2O$ | 0-4 |
| $K_2O$ | 0-3 |
| LOI | 0-15 |

| Blast Furnace Slag | |
|---|---|
| Component | Percentage |
| $SiO_2$ | 27-38 |
| $Al_2O_3$ | 7-12 |
| $Fe_2O_3$ or FeO | 0.2-1.6 |
| CaO | 34-43 |
| MgO | 7-15 |
| MnO | 0.15-0.76 |
| S | 1-1.9 |

| Steel Slag | |
|---|---|
| Component | Percentage |
| $SiO_2$ | 10-19 |
| $Al_2O_3$ | 1-3 |
| $Fe_2O_3$ or FeO | 10-40 |
| CaO | 40-52 |
| MgO | 5-10 |
| MnO | 5-8 |
| S | 0-0.1 |
| $P_2O_5$ | 0.5-1 |
| Metallic Fe | 0.5-10 |

| Perlite By-product | |
|---|---|
| Component | Percentage |
| $SiO_2$ | 70-75 |
| $Al_2O_3$ | 12-15 |
| $Fe_2O_3$ or $FeO$ | 0.5-2 |
| $CaO$ | 0.5-1.5 |
| $MgO$ | 0.2-0.7 |
| $Na_2O$ | 3-4 |
| $K_2O$ | 3-5 |
| LOI | 3-5 |

| Lime Kiln Dust | |
|---|---|
| Component | Percentage |
| CaO (free) | 17-25 |
| CaO | 56-60 |
| MgO | 1.1-4.9 |
| $SiO_2$ | 8-17 |
| $Al_2O_3$, $Fe_2O_3$, MnO, $TiO_2$, $P_2O_3$ | 5-5.5 |
| $CO_2$ | 13-18 |
| LOI | 14-23 |

| Cement Kiln Dust | |
|---|---|
| Component | Percentage |
| $Ca_2CO_3$ | 30-60 |
| $SiO_2$ | 10-20 |
| $Al_2O_3$ | 2-6 |
| $Fe_2O_3$ or $FeO$ | 1-4 |
| CaO | 5-40 |
| MgO | 1-4 |
| $Na_2SO_4$ | 1-3 |
| $CaSO_4$ | 2-8 |
| $K_2SO_4$ | 3-9 |
| KCl | 1-3 |
| KF | 0.1-1 |

Exothermic Reactions and Related Factors

In the processes of this invention, an exothermic reaction between the primary wallboard components (e.g., post-industrial waste combination, pH modifiers and water) naturally generates heat. As a result, a series of chemical reactions can be initiated to form cementitious components within the recycled material. The exothermic reactions discussed here can use many of kinds of pH modifiers or pH modifying agents, which are well known in the industry as well as the minerals from which they are derived. Such pH modifying agents include calcium oxide, magnesium oxide, potassium hydroxide, sodium hydroxide, calcium hydroxide, calcium carbonate, potassium carbonate, sodium carbonate, sodium sesquicarbonate (natural Trona ore), sodium silicate, calcium silicate, magnesium silicate or calcium aluminate to name a few.

The reaction time of the resulting exothermic reactions can be also controlled by many factors including the total composition of slurry, the fillers in the slurry, the amount of water or other liquids in the slurry, the addition of a water reduction agent or the addition of a retarder or accelerator. Retarders can be added to slow down a reaction and may include any one or more of the following: boric acid, borax, sodium tripolyphosphate, sodium sulfonate, citric acid and many other commercial retardants common to the industry. Accelerators can be added to speed up the reaction and can include any one or more of the following materials such as sodium carbonate, potassium carbonate, potassium hydroxide, aluminum hydroxide, sodium hydroxide, calcium hydroxide, calcium chloride, calcium oxide, calcium nitrate, potassium nitrate, sodium trimetaphosphate, calcium formate, triethanolamine, Portland cement and other commercial accelerators common to the industry. Ideally one should avoid the addition of Portland cement due to its high embodied energy. Water reducers, sometimes called dispersants, are liquid additives that may inhibit flocking of particles so that good particle distribution can be obtained without making additional water necessary. Water reducing agents are also well known in the industry, and examples include polysaccharides, lignosulfonates, napthlenesulfonates and polycarboxylates. These and other factors or additives may control or otherwise affect the reaction time for the exothermic reactions resulting from the manufacturing of building materials provided herein.

Figure 2:
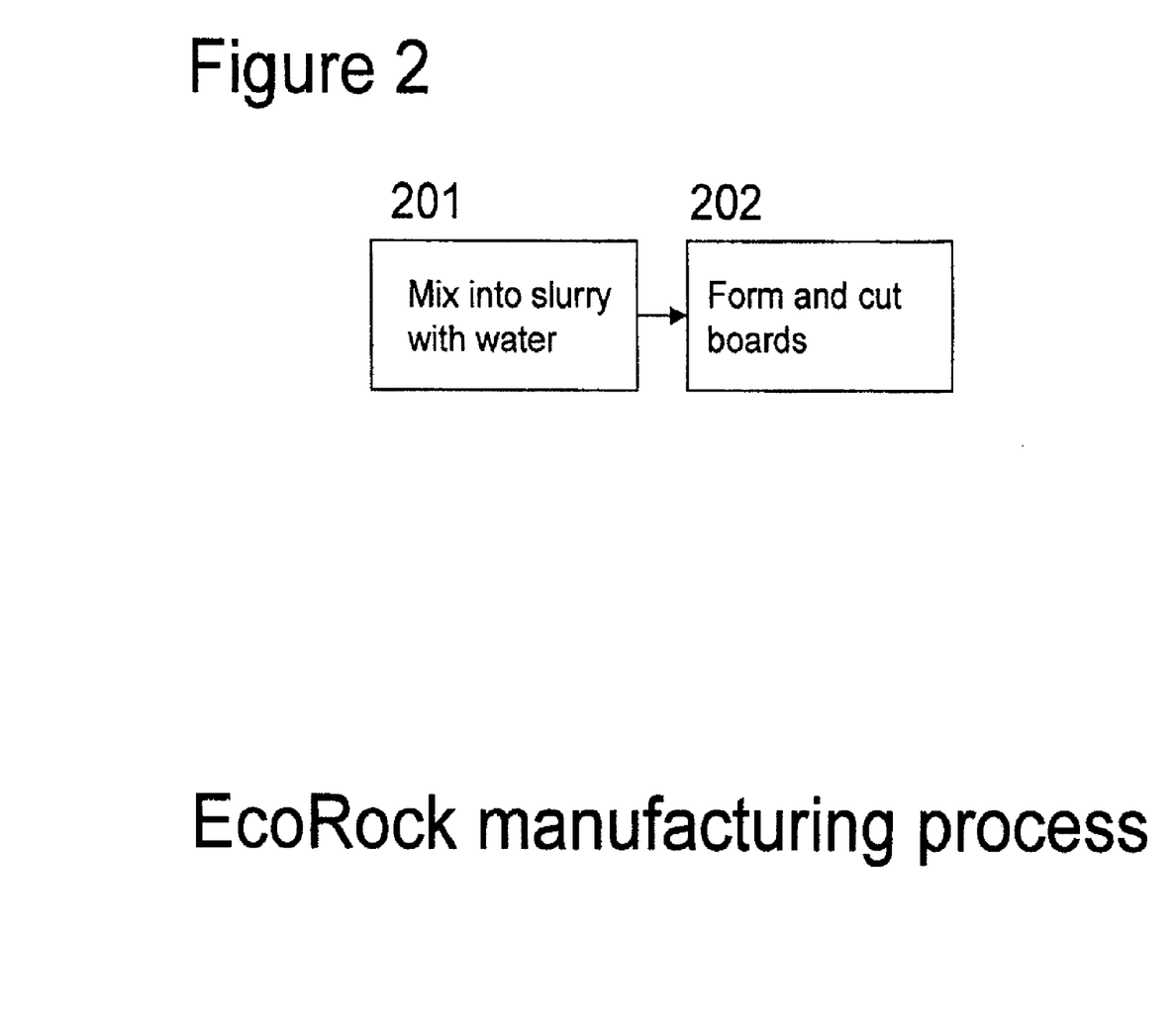
FIG. 2 shows an overview of the steps to manufacture low embodied energy wallboards provided in accordance with the invention which require little energy or substantially less energy in comparison to traditional gypsum drywall.

FIG. 2 is a basic flow diagram illustrating methods of manufacturing wallboards provided in accordance with another aspect of the invention. The simplicity of some these process can be appreciated in that FIG. 2 shows two steps: Step 201—mixing the dry mix with water; and Step 202—forming the wallboards from the slurry. The wallboards can either be formed in molds or formed using a conveyor system of the type used to form gypsum wallboards and then cut to the desired size as more fully described in many of the references identified above.

As shown in the process of FIG. 2, while a slurry starts thickening quickly, an exothermic reaction can proceed to heat the slurry, and eventually the slurry sets into a hard mass. Typically maximum temperatures during the exothermic reaction of 35° C. to 55° C. have been observed depending on content and size of mix. The resulting hardness can also be controlled by the amount of naturally occurring fillers found in the post-industrial waste, and can vary from extremely hard and strong to soft (but dry) and easy to break. Other parameters such as set time, strength required to remove the boards from molds or from a continuous slurry line, can be varied from twenty (20) seconds to days, depending on the additives or fillers. For instance, boric acid can extend a set time from seconds to hours where powdered boric acid is added to the binder in a range of 0% (seconds) to 4% (hours). While a set time of twenty (20) seconds can lead to extreme productivity, the slurry may begin to set too soon for high quality manufacturing, and thus the set time should be adjusted to a longer period of time typically by adding boric acid or other applicable retarder. Other additives and factors described elsewhere herein can be utilized to control or manipulate set times.

Many different configurations of materials may be provided in accordance with this invention. Such materials may result in improved strength, hardness, score/snap capability, paper adhesion, thermal resistance, weight and fire resistance. The resulting post-industrial waste mixtures herein can be compatible with many different additives including cornstarch, wheat starch, tapioca starch, potato starch, synthetic starch, naturally-occurring minerals, ceramic microspheres, foam, fibers and other low-embodied energy materials. Uncalcined gypsum may also be used as a filler but is not required to form a cementitious wallboard core. By carefully choosing low-energy, plentiful, biodegradable materials as additives, such as those listed above, preferable wallboards can be manufactured that begin to take on the characteristics of gypsum wallboard. These characteristics (weight, structural strength so as to be able to be carried, the ability to be scored and then broken along the score line, the ability to resist fire, and the ability to be nailed or otherwise attached to other materials such as studs) are important to the marketplace and are required to make the product a commercial success as a gypsum wallboard replacement.

Cornstarch (made from corn endosperm), wheat starch (by-product of wheat gluten production), tapioca starch (extracted from tapioca plant roots), and potato starch (extracted from potato plant roots) are plentiful and non toxic and can enhance paper adhesion. Synthetic starches are polysaccharides (sugar based polymers) that may be substituted for a similar polymer adhesive such as polyvinyl alcohol. Ceramic microspheres can reduce the weight of materials as well as increase thermal and fire resistance of the wallboards that incorporate these materials. Biofibers (i.e. biodegradable plant-based fibers) are used for tensile and flexural strengthening in this embodiment; however other fibers, such as cellulose, glass or recycled-materials, may also be used. The use of specialized fibers in cement boards is disclosed in U.S. Pat. No. 6,676,744 (incorporated by reference herein) and is well known to those practicing the art.

While preferable embodiments of the invention are described by way of the following examples, it will be obvious to those skilled in the art that such embodiments are for illustrative purposes. Numerous variations, changes, and substitutions will occur to those skilled in the art without departing from the scope of the invention. It shall be understood that different aspects of these examples can be appreciated separately, collectively or in combination with each other or other embodiments of the invention described herein.

EXAMPLE 1

In one embodiment of the present invention, a dry mix of powders is prepared by mixing ground blast furnace slag, kiln dust, fly ash, pH modifier, accelerator and fibers to form the dry mix. Then, water containing a liquid dispersant is added to the dry mix followed by the addition of generated foam resulting in the following materials by approximate weight in percentages:

| | |
|---|---|
| Slag | 49.8% |
| Kiln Dust | 21.8% |
| Fly Ash Type C | 14.9% |
| pH Modifier | 11.8% |
| Accelerator | 1.1% |
| Fibers | 0.2% |
| Foamer | 0.3% |
| Water Reducer | 0.1% |

Slag, kiln dust and fly ash type C combine for a total post-industrial waste content of 86.4% and the self-reacting hardening process begins, which in this case is started by the pH modifier, powdered sodium sesquicarbonate which is derived from natural trona ore. Water, equivalent to 46.2% of the above materials by weight, is added to form a slurry or generate foam. Along with the foam, the unreacted components materials form a filler in the slurry. The fibers add flexural strength to the core when the slurry has hardened. For increasing the output of production machinery, aluminum hydroxide is an accelerator used to speed up the exothermic reaction and thus speed up the setting of the slurry. Mixers of many varieties may be used, such as a pin mixer or continuous mixer, provided the mix can be quickly removed from the mixer prior to hardening.

The foam is premixed separately with water (typically in a foam generator) in a concentration of one-tenth of one percent (0.1%) to 5% foamer agent (a soap or surfactant) by weight to the combination of roamer and water, depending on the desired elasticity. In the above embodiment (Example 1) twenty-five hundredths of one percent (0.25%) foamer agent by weight of the resulting combination of water and roamer is used. The gypsum wallboard industry typically uses two-tenths of one percent (0.2%) roamer agent by weight. The resulting foam is added to the wet mix and as shown in Example 1 above. In this example, the foam is nine percent (9%) by weight of the total weight of the entire mix. The amount of foam depends on the desired density and strength of the hardened core, with 0.1%-15% foam by weight being optimal.

Examples of foam used in gypsum wallboards include those described in U.S. Pat. Nos. 5,240,639, 5,158,612, 4,678,515, 4,618,380 and 4,156,615, which are incorporated by reference herein. The use of such agents is well known to those manufacturing gypsum wallboard and other cementitious products.

The slurry may be poured onto a paper facing, which can be wrapped around the sides as in a standard gypsum process. However, versions may be made with or without paper on one or both sides.

The exothermic reaction will begin almost immediately after removal from the mixer and continue for several hours, absorbing a portion of the water into the reaction. Boards can be cut and removed in less than thirty (30) minutes, and often less than five (5) minutes depending on requirements and handling equipment available. All of the water has not yet been used in the reaction, and some absorption of the water will continue for many hours. Within twenty-four to forty-eight (24-48) hours, the majority of water has been absorbed, with evaporation occurring as well. When paper facing is used, it is recommended that the boards be left to individually dry for 24 hours so as to reduce the possibility of mold forming on the paper. This can be accomplished on racks or spacers at room temperature with no heat required. Drying time may be faster at higher temperatures and slower at lower temperatures above freezing. Temperatures above 80° F. were tested but not considered since the design targets a low energy process. Residual drying will continue to increase at higher temperatures, however it is not beneficial to apply heat (above room temperature) due to the need of the exothermic reaction to utilize the water that would thus be evaporated too quickly. While the exothermic reaction will occur below freezing, the residual water will be frozen within the core until the temperature rises above freezing.

The resulting boards (finished product) may have strength characteristics similar to or greater than the strength characteristics of gypsum wallboards, and can be easily scored and snapped in the field. High density boards which are often used for tile backing and exterior applications do not exhibit many of the benefits of the wallboards processed in accordance with this invention such as low weight, satisfactory score and snap characteristics, and paper facing.

EXAMPLE 2

In another embodiment, the same amounts of dry powders and liquids as in Example 1 are mixed together in the same proportions, but the amount of accelerator added is doubled.

In this case, the reaction occurs much more rapidly such that the boards may be cut and removed in under 2 minutes.

| | |
|---|---|
| Slag | 49.25% |
| Kiln Dust | 21.55% |
| Fly Ash Type C | 14.74% |
| pH Modifier | 11.67% |
| Accelerator | 2.20% |
| Fibers | 0.20% |
| Foamer | 0.30% |
| Water Reducer | 0.10% |

EXAMPLE 3

In another embodiment, the same proportions of materials as in Example 1 are mixed together, but the foam is substituted with ceramic microspheres, which are hollow spheres derived from fly ash. This produces a board of increased strength and weight. This board utilizes even more recycled materials and thus may cater even more to national environmental building rating systems such as LEED, developed by the United States Green Building Council.

| | |
|---|---|
| Slag | 49.80% |
| Kiln Dust | 21.80% |
| Fly Ash Type C | 14.90% |
| pH Modifier | 11.80% |
| Accelerator | 1.10% |
| Fibers | 0.20% |
| Microspheres | 0.30% |
| Water Reducer | 0.10% |

EXAMPLE 4

In another embodiment, a board is made for exterior use (which may be a substitute for cement board or high density gypsum board) by removing the foam, and thus in the core of the to-be-formed wallboard. The fiber reinforcement is also doubled to offer more environmental resistance and flexural strength. This gives to the resulting low embodied energy wallboard additional strength and water resistance. In addition, in this embodiment, no paper facing or wrap is used because the wallboard will be exposed to the environment. The ingredients of this embodiment are as follows:

| | |
|---|---|
| Slag | 49.95% |
| Kiln Dust | 21.87% |
| Fly Ash Type C | 14.94% |
| pH Modifier | 11.84% |
| Accelerator | 1.10% |
| Fibers | 0.20% |
| Water Reducer | 0.10% |

Water, equivalent to 46.2% of the above materials by weight, is then added to form a slurry.

The processing of the slurry may occur using several different techniques depending on a number of factors such as quantity of boards required, manufacturing space and familiarity with the process by the current engineering staff. The normal gypsum slurry method using a conveyor system, which is a continuous long line that wraps the slurry in paper, is one acceptable method for fabricating the low embodied energy wallboards of this invention. This process is well known to those skilled in manufacturing gypsum wallboard. Also the Hatscheck method, which is used in high density (i.e. cement) board manufacturing, is acceptable to manufacture the wallboards of this invention, specifically those that do not require paper facing or backing, and is well known to those skilled in the art of cement board manufacturing. Additional water is required to thin the slurry when the Hatscheck method is used because the manufacturing equipment used often requires a lower viscosity slurry. Alternatively as another manufacturing method, the slurry may be poured into pre-sized molds and allowed to set. Each board can then be removed from the mold, which can be reused.

Also, due to the inherent strength that can be achieved with a higher reactionary waste material composition to waste-based filler ratio, other cementitious objects can be formed which can be used in construction or potentially other fields. These objects may not be in the form of panels but could be in the form of any cementitious objects normally made using Portland cement. Such objects can be poured and dry quickly, setting within a few minutes either in molds or on site.

While each of aforementioned examples include type C fly ash as a component, an additional advantage provided by the invention is that the all or some of the fly ash used can be eliminated and replaced with slag or other waste materials to provide other alternate embodiments. The quality of the resulting product can remain substantially the same as if the product contained fly ash. This is shown below in accordance with ASTM testing methods. As the lime kiln dust content (LKD/PA) increases, the edge hardness, core hardness, flexural strength and compressive strength can become optimal. Depending on source-specific chemical compositions of each waste material, it can be preferred to substitute type C fly ash with lime kiln dust in some of the low embodied energy wallboards provided herein.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A wallboard comprising:
   at least one post-industrial waste product substantially free of gypsum-based compositions selected from the group consisting of: steel slag, blast furnace slag, metal purification slag, expanded perlite by-product, lime kiln dust, cement kiln dust;
   less than fifty percent (50%) by weight of fly ash; and
   at least one pH modifier.

2. The wallboard of claim 1 wherein said pH modifier comprises one or more materials selected from the group consisting of: calcium oxide, magnesium oxide, potassium hydroxide, sodium hydroxide, calcium hydroxide, calcium carbonate, potassium carbonate, sodium carbonate, sodium sesquicarbonate, sodium silicate, calcium silicate, magnesium silicate or calcium aluminate.

3. The wallboard of claim 1 further comprising water.

4. The wallboard of claim 1 wherein the post-industrial waste comprises approximately 60 percent (60%) or more of the total weight of the wallboard.

5. The wallboard of claim 1, further comprising fibers selected from the group consisting of: biofibers, nylon, fiberglass, cellulose and recycled petroleum waste.

6. The wallboard of claim 1 further comprising a filler of foam.

7. The wallboard of claim 1 further comprising paper on one or both sides.

8. A method of fabricating a low-embodied energy building material, comprising:
   forming a dry mix comprising less than 50% by weight fly ash and at least one post-industrial waste products, said post-industrial waste products being selected from the group consisting of steel slag, blast furnace slag, metal purification slag, expanded perlite by-product, lime kiln dust, cement kiln dust;
   adding to said dry mix at least one pH modifier, wherein said pH modifier comprises one or more ingredients selected from the group consisting of: calcium oxide, magnesium oxide, potassium hydroxide, sodium hydroxide, calcium hydroxide, calcium carbonate, potassium carbonate, sodium carbonate, sodium sesquicarbonate, sodium silicate, calcium silicate, magnesium silicate or calcium aluminate;
   adding water to said dry mix to form an initial slurry in a slurry line; and
   allowing the initial slurry to set without the application of heat.

9. The method of claim 8 further comprising a step of: cutting the set slurry to a desired shape.

10. The method of claim 8 further comprising a step of: adding a retarder material to the slurry to increase the time taken for the slurry to set.

11. The method of claim 8 further comprising a step of: adding an accelerator material to the slurry to decrease the time taken for the slurry to set.

12. The method of claim 8 further comprising a step of: pouring the slurry into a mold of desired shape.

13. The low-embodied energy wallboard of claim 1, wherein said wallboard comprises greater than fifty percent (50%) of said at least one post-industrial waste product.

14. A low-embodied energy wallboard, comprising:
   at least one paper outer layer covering a core containing at least 5% lime kiln dust by weight;
   water;
   at least one pH modifying agent; and
   less than fifty percent (50%) by weight fly ash.

15. A low-embodied energy wallboard, comprising:
   at least one substantially gypsum free industrial waste by-product composition comprising at least 5% kiln dust by weight,
   less than fifty percent (50%) by weight fly ash; and
   a pH modifying agent.

* * * * *

UNITED STATES PATENT AND TRADEMARK OFFICE
CERTIFICATE OF CORRECTION

| | | |
|---|---|---|
| PATENT NO. | : 8,337,993 B2 | Page 1 of 1 |
| APPLICATION NO. | : 12/060196 | |
| DATED | : December 25, 2012 | |
| INVENTOR(S) | : Kevin Surace | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 111 days.

Signed and Sealed this

Thirteenth Day of January, 2015

Michelle K. Lee
*Deputy Director of the United States Patent and Trademark Office*